March 2, 1926.
G. W. CLARK
1,574,791
ANTISLIPPING ATTACHMENT FOR VEHICLE WHEELS
Filed May 6, 1925
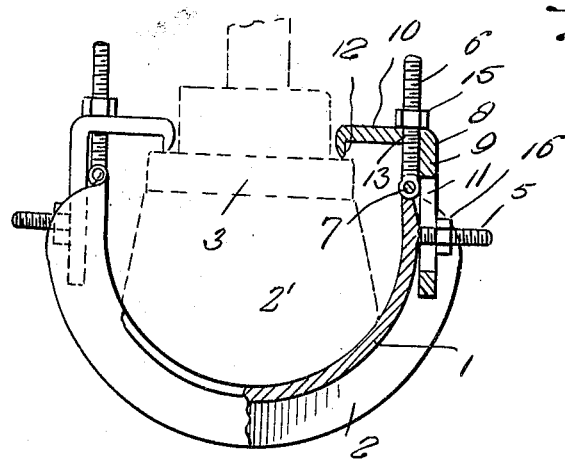
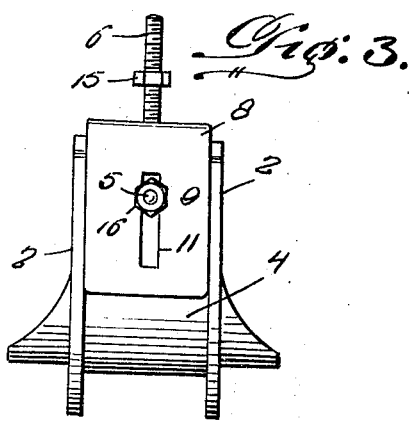
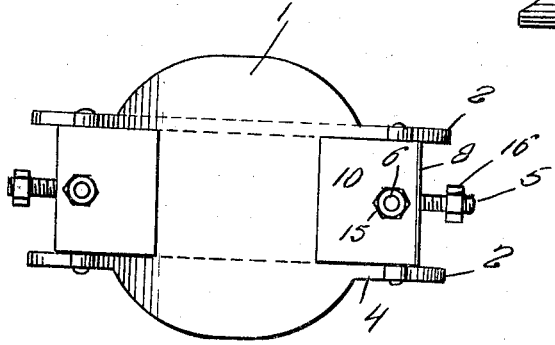
Inventor
G. W. Clark,
By
Attorney Patented Mar. 2, 1926.

1,574,791

UNITED STATES PATENT OFFICE.

GEORGE W. CLARK, OF LARRYVILLE, PENNSYLVANIA.

ANTISLIPPING ATTACHMENT FOR VEHICLE WHEELS.

Application filed May 6, 1925. Serial No. 28,414.

*To all whom it may concern:*

Be it known that I, GEORGE W. CLARK, a citizen of the United States, residing at Larryville, in the county of Lycoming and State of Pennsylvania, have invented certain new and useful Improvements in Antislipping Attachments for Vehicle Wheels, of which the following is a specification.

The present invention relates to an antislipping device for vehicle wheels and particularly is designed for the wheels now in use on motor vehicles.

The principal object of the invention is to provide a device of this nature, which may be easily and quickly attached to a wheel, in order to prevent it from slipping in the mud or snow.

Another important object of the invention is to provide an attachment of this nature which is adjustable for engagement with different sized wheels and over different sized tires.

A still further object of the invention is to provide a device of this nature with an exceedingly simple construction, one which is inexpensive to manufacture, strong, durable, efficient and reliable.

With the above and numerous other objects in view, as will appear as the description proceeds, the invention resides in certain novel features of construction, and in the combination and arrangement of parts as will be hereinafter more fully described and claimed.

In the drawing:

Figure 1 is an end elevation of the attachment embodying the features of my invention, portions being shown in section.

Figure 2 is a plan view of the device, and

Figure 3 is a side elevation thereof.

Referring to the drawing in detail, it will be seen that 1 designates the body plate which is curved transversely to conform to the curvature of the tread of a tire 2', mounted on rim 3. One or more ribs 2 are mounted on the outer surface of the body plate 1 and if a plurality of ribs is provided, as in the present example of the invention, said ribs will be disposed in parallel planes.

The plane of each rib is disposed rectangularly to the median dimension of the plate 1. The ribs extend beyond the side edges of the plate, as is clearly seen from an inspection of Figure 1. The median portions of the side edges of the plate 1 are provided with extensions 4, disposed between the ribs. Threaded studs 5 extend laterally from the extensions 4 a slight distance from the ends thereof. Bolts 6 are pivoted as at 7 to the ends of the extensions 4. Retaining lugs 8 are provided for holding the attachment on the wheel against displacement. Each lug 8 is of a substantial L-shaped formation, including a relatively long leg 9 and a relatively short leg 10. The long leg 9 is provided with a longitudinally extending slot 11. The terminal of the leg 10 is provided with a laterally disposed engaging extension 12. The leg 10 is also provided with an opening 13 adjacent its juncture with the leg 9. The slots 11 receive the studs 5 and the openings 13 receive the bolts 6. Nuts 15 are threaded on the bolts 6 and nuts 16 are threaded on the bolts 5. When the nuts 16 are disposed adjacent the ends of the studs 5, the lugs 8 may be swung outwardly and the body plate 1 applied to the tread of the tire as is indicated in Figure 1. The lugs 8 may then be positioned so that the engaging extensions 12 are engaged with the inner surface of the rim 3. The nuts 15 and 16 are then tightened against the respective legs 10 and 11. When thus fastened, the attachment cannot be easily displaced, and the ribs 2 will efficiently prevent the wheel from slipping in the mud or snow, so that the automobile or like vehicle may pull out of such places where its traction wheels would ordinarily spin.

The present embodiment of the invention has been disclosed merely by way of example, and it will be apparent that numerous changes in the details of construction, and in the combination and arrangement of parts may be resorted to without departing from the spirit or scope of the invention as hereinafter claimed or sacrificing any of its advantages.

Having thus described my invention, what I claim as new is:

A device of the class described including a body plate, studs extending laterally from the body plate, bolts pivoted to the ends of the body plate, and lugs each including a pair of rectangularly disposed portions, one of which is provided with an aperture for receiving one of the bolts and the other with a slot for receiving one of the studs, and nuts on the bolts and studs.

In testimony whereof, I affix my signature.

GEORGE W. CLARK.